(12) United States Patent
Gal

(10) Patent No.: US 10,959,315 B2
(45) Date of Patent: Mar. 23, 2021

(54) SYSTEM AND METHOD FOR OPERATION OF MULTIPLE LIGHTING UNITS IN A BUILDING

(71) Applicant: SIGNIFY HOLDING B.V., Eindhoven (NL)

(72) Inventor: Jean-Philippe Gal, Hong Kong (CN)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 15/514,770

(22) PCT Filed: Mar. 11, 2016

(86) PCT No.: PCT/CN2016/076144
§ 371 (c)(1),
(2) Date: Mar. 27, 2017

(87) PCT Pub. No.: WO2017/152418
PCT Pub. Date: Sep. 14, 2017

(65) Prior Publication Data
US 2018/0368238 A1 Dec. 20, 2018

(51) Int. Cl.
*H05B 47/10* (2020.01)
*H05B 47/19* (2020.01)
(Continued)

(52) U.S. Cl.
CPC .......... *H05B 47/19* (2020.01); *G06F 3/0486* (2013.01); *G06F 3/0488* (2013.01);
(Continued)

(58) Field of Classification Search
CPC .............. H05B 37/02; H05B 37/0272; H05B 37/0245; H05B 37/0254; H05B 33/08;
(Continued)

(56) References Cited

U.S. PATENT DOCUMENTS 7,047,092 B2    5/2006  Wimsatt
7,498,952 B2*   3/2009  Newman, Jr. .......... H01Q 7/005
                                                    307/139
(Continued)

FOREIGN PATENT DOCUMENTS

CN    101023710 A    8/2007
CN    101282605 A    10/2008
(Continued)

OTHER PUBLICATIONS

Extended European Search Report, dated Jul. 18, 2018, for European Application No. 16845322.3-1204, 8 pages.
(Continued)

*Primary Examiner* — Thai Pham
(74) *Attorney, Agent, or Firm* — Patrick T. Driscoll

(57) ABSTRACT

A system for controlling a plurality of lighting units that are located in spaces of a building, each of said plurality of lighting units including an illumination module via which a respective lighting characteristic is able to be output therefrom; the system including at least one lighting settings module configured for storing predefined settings indicative of default lighting characteristics for output by illumination modules of lighting units that are associated with each of the spaces or types of spaces; a user input unit via which a user is able to selectably associate at least one of the plurality of lighting units with any one of the spaces or types of spaces in which it is located; and at least one control module whereby, responsive to the user associating at least one of the plurality of lighting units with the space or type of space in which it is located, the at least one control module is configured to operate the illumination module of the at least one lighting unit so as to output the default lighting characteristic for the illumination module of the at least one lighting unit associated with the space or type of space in
(Continued)

which it is located by reference to the predefined settings stored in the at least one lighting settings module.

16 Claims, 4 Drawing Sheets

(51) Int. Cl.
  *H04L 12/28*   (2006.01)
  *G06F 3/0481*  (2013.01)
  *G06F 3/0484*  (2013.01)
  *G06F 3/0486*  (2013.01)
  *G06F 3/0488*  (2013.01)
(52) U.S. Cl.
  CPC ...... *G06F 3/04817* (2013.01); *G06F 3/04842* (2013.01); *H04L 12/2807* (2013.01); *H04L 12/2829* (2013.01); *H04L 2012/285* (2013.01)
(58) Field of Classification Search
  CPC .. H05B 33/0803; H05B 47/10; H05B 47/175; H05B 47/19; G06F 3/04817; G06F 3/04842; G06F 3/0486; G06F 3/0488
  See application file for complete search history.

(56) References Cited

U.S. PATENT DOCUMENTS

| | | | | |
|---|---|---|---|---|
| 7,925,384 B2* | 4/2011 | Huizenga | ............ | H05B 37/0272 315/149 |
| 8,053,994 B2* | 11/2011 | Liu | .................... | H05B 37/0227 307/119 |
| 8,368,310 B1* | 2/2013 | Roosli | ............... | H05B 37/0245 315/152 |
| 2007/0090960 A1* | 4/2007 | Miki | ...................... | H05B 37/02 340/641 |
| 2008/0183651 A1* | 7/2008 | Hunter | .................... | G06F 3/002 706/47 |
| 2009/0299527 A1* | 12/2009 | Huizenga | ........... | H05B 37/0245 700/275 |
| 2012/0080944 A1* | 4/2012 | Recker | ...................... | H02J 9/02 307/25 |
| 2014/0015415 A1* | 1/2014 | Lim | ................... | H05B 37/0272 315/131 |
| 2014/0070707 A1* | 3/2014 | Nagazoe | ........... | H04B 10/116 315/151 |
| 2014/0285113 A1* | 9/2014 | Huang | ............... | H05B 37/0272 315/297 |
| 2015/0223308 A1 | 8/2015 | Yen | | |
| 2015/0245450 A1* | 8/2015 | Sung | .................. | H05B 37/0272 315/292 |
| 2015/0334811 A1* | 11/2015 | So | .......................... | H05B 37/02 315/152 |
| 2015/0342002 A1* | 11/2015 | Jorgensen | ............ | H05B 33/086 315/297 |
| 2016/0037614 A1 | 2/2016 | Setomoto et al. | | |
| 2018/0288847 A1* | 10/2018 | Halliwell | ............. | H05B 33/086 |

FOREIGN PATENT DOCUMENTS

| | | |
|---|---|---|
| CN | 104837281 A | 8/2015 |
| CN | 204652728 U | 9/2015 |
| WO | 2013/121311 A1 | 8/2013 |

OTHER PUBLICATIONS

International Search Report and Written Opinion, dated Oct. 28, 2016, for International Application No. PCT/CN2016/076144, 9 pages.

* cited by examiner

SYSTEM AND METHOD FOR OPERATION OF MULTIPLE LIGHTING UNITS IN A BUILDING

TECHNICAL FIELD

The present invention relates to a system and method for operation of multiple lighting units in a household or commercial premises.

BACKGROUND OF THE INVENTION

There is a perceived need to improve the manner in which users are able to control multiple lighting units such as lamps, luminaries, spotlights and the like in household and commercial environments.

Certain existing systems only provide a one-to-one control interface whereby a user must manually configure and control each lighting unit in a large group one at a time which is a tedious and time-consuming exercise. The problem is further exacerbated where the user lacks the technical skill to suitably configure the operational settings of different types of lighting units installed in different types of rooms of a building so as to produce optimal output performance from each of the different types of lighting units under different environmental conditions.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form, the present invention provides a system for controlling a plurality of lighting units that are located in spaces of a building, each of said plurality of lighting units including an illumination module via which a respective lighting characteristic is able to be output therefrom; the system including:

at least one lighting settings module configured for storing predefined settings indicative of default lighting characteristics for output by illumination modules of lighting units that are associated with each of the spaces or types of spaces;

a user input unit via which a user is able to selectably associate at least one of the plurality of lighting units with any one of the spaces or types of spaces in which it is located; and at least one control module whereby, responsive to the user associating at least one of the plurality of lighting units with the space or type of space in which it is located, the at least one control module is configured to operate the illumination module of the at least one lighting unit so as to output the default lighting characteristic for the illumination module of the at least one lighting unit associated with the space or type of space in which it is located by reference to the predefined settings stored in the at least one lighting settings module.

Preferably, the present invention may be further configured to allow the user to selectably define and control together, via the user input unit, a group of lighting units comprising at least two of the plurality of lighting units of a same type located within a same space or same type of space. A system as claimed in any one of claims 1 to 11 including a sensor module for sensing a useage pattern in relation to operation of at least two of the plurality of lighting units and whereby in response to said useage pattern meeting a predetermined matching criteria, the at least two of the plurality of lighting units are configurable to operate automatically in accordance with the sensed useage pattern.

Preferably, the present invention may include a sensor module for sensing a condition when at least two of the plurality of lighting units of a same type are located within a same space o same type of space, wherein responsive to the sensing of the condition by the sensor module, the user input unit may be configured to communicate a message instructing the user to store a defined group setting in the lighting settings module that is indicative of a group of lighting units comprising the at least two of the plurality of lighting units and whereby the group of lighting units is able to be controlled together via the user input unit. Alternatively, the present invention may include a sensor module for sensing a condition when at least two of the plurality of lighting units of a same type are located within a same space or same type of space, wherein responsive to the sensing of the condition by the sensor module, the lighting settings module may be configured to automatically store a defined group setting indicative of a group of lighting units comprising the at least two of the plurality of lighting units and whereby the group of lighting units is able to be controlled together via the user input unit.

Preferably, each of the plurality of lighting units may include a lighting settings module and a control module integrally formed therein. Alternatively, the present invention may include a central control unit having the at least one lighting settings module and the at least one control module integrally formed therein, said central control unit being configured for centrally controlling operation of the plurality of lighting units.

Preferably, the present invention may include a wireless communication network via which the user input unit may be configured to operably communicate with each of the plurality of lighting units and/or via which the central control unit may be configured to operably communicate with each of the plurality of lighting units.

Preferably, the communication network may include at least one of a WI-Fi, a Bluetooth and a Zigbee protocol based communication network.

Typically, the plurality of spaces may include at least one of a dining room, a kitchen, a bathroom, a bedroom, a living room, a hallway, a study, a garage, and an outdoor space in relation to the building.

Preferably, the default lighting characteristics corresponding to each of the spaces may be defined by at least one of:
 i. a colour characteristic;
 ii. a brightness characteristic;
 iii. a white light colour temperature; and
 iv. a timing characteristic for the output of at least one of (i)-(iii).

Preferably, the user input unit may include at least one of a mobile phone, a tablet, and a computer.

In another broad form, the present invention provides a method of controlling a plurality of lighting units that are located in spaces of a building, each of said plurality of lighting units including an illumination module via which a respective lighting characteristic is able to be output therefrom, the method including steps of:

(i) storing, in at least one lighting settings module, predefined settings indicative of default lighting characteristics for lighting units that are associated with each of the spaces or types of spaces;

(ii) selectably associating, via a user input unit, at least one of the plurality of lighting units with any one of the spaces or types of spaces in which it is located; and (iii) providing at least one control module whereby, responsive to the user associating at least one of the plurality of lighting units with the space or type of space in which it is located, the at least one control module is configured to operate the illumination module of the at least one lighting unit so as to output the default lighting characteristic for the illumination module of the at least one lighting unit associated with the space or type of space in which it is located by reference to the predefined settings stored in the at least one lighting settings module.

Preferably, the present invention may be further configured to allow the user to selectably define and control together, via the user input unit, a group of lighting units comprising at least two of the plurality of lighting units of a same type located within a same space or type of space.

Preferably, the present invention may include a sensor module for sensing a condition when at least two of the plurality of lighting units of a same type are located within a same space or type of space, wherein responsive to the sensing of the condition by the sensor module, the user input unit may be configured to communicate a message instructing the user to store a defined group setting in the lighting settings module that is indicative of a group of lighting units comprising the at least two of the plurality of lighting units and whereby the group of lighting units is able to be controlled together via the user input unit. Alternatively, the present invention may include a sensor module for sensing a condition when at least two of the plurality of lighting units of a same type are located within a same space or type of space, wherein responsive to the sensing of the condition by the sensor module, the lighting settings module may be configured to automatically store a defined group setting indicative of a group of lighting units comprising the at least two of the plurality of lighting units and whereby the group of lighting units is able to be controlled together via the user input unit.

Preferably, each of the plurality of lighting units may include a lighting settings module and a control module integrally formed therein. Alternatively, the present invention may include a central control unit having the at least one lighting settings module and the at least one control module integrally formed therein, said central control unit being configured for centrally controlling operation of the plurality of lighting units.

Preferably, the present invention may include a wireless communication network via which the user input unit is configured to operably communicate with each of the plurality of lighting units and/or via which the central control unit is configured to operably communicate with each of the plurality of lighting units.

Preferably, the communication network may include at least one of a WI-Fi, a Bluetooth and a Zigbee protocol based communication network.

Typically, the plurality of spaces may include at least one of a dining room, a kitchen, a bathroom, a bedroom, a living room, a hallway, a study, a garage, and an outdoor space in relation to the building.

Preferably, the default lighting characteristics corresponding to each of the spaces may be defined by at least one of:
  i. a colour characteristic;
  ii. a brightness characteristic;
  iii. a white light colour temperature; and
  iv. a timing characteristic for the output of at least one of (i)-(iii).

Preferably, the user input unit may include at least one of a mobile phone, a tablet, and a computer.

In another broad form, the present invention provides a lighting unit for use in a building having a plurality of spaces and being operable by a user input unit via a wireless communication network, the lighting unit including:

an illumination module via which a lighting characteristic is able to be output from the lighting unit;

a lighting settings module configured for storing predefined settings indicative of default lighting characteristics for output by the illumination module when the lighting unit is associated with any one of the spaces or types of spaces; and a control module configured such that, in response to the user associating the lighting unit with the space or type of space in which the lighting unit is located, the control module is configured to operate the illumination module to output the default lighting characteristic associated with the space or type of space in which it is located by reference to the predefined settings stored in the lighting settings module.

It will be apparent that the broad forms of the present invention may assist in providing at least one of the following advantages:

(i) by allowing lighting units to be associated with rooms or a room type of a building in which each lighting unit is located, predefined default lighting characteristics that have been determined in accordance with established best practices may be automatically output by each lighting unit so as to be optimally suited to the room or room type in which the lighting units are located. This may be particularly useful for users with limited technical skills in configuring operation of lighting units to quickly and easily set up lighting units in a household without involving tedious, complicated and time-consuming configuring of the devices.

(ii) grouping of lighting units together in accordance with an established set of best practices may assist a user in centrally personalise and control multiple lighting units of the same type in the same room simultaneously so as to minimise unnecessary duplication of time and effort.

BRIEF DESCRIPTION OF THE DRAWINGS

The present invention will become more fully understood from the following detailed description of a preferred but non-limiting embodiment thereof, described in connection with the accompanying drawings, wherein.

DETAILED DESCRIPTION OF THE PREFERRED EMBODIMENTS

Preferred embodiments of the present invention will now be described with reference to the drawings FIGS. 1 to 4.

Figure 4:
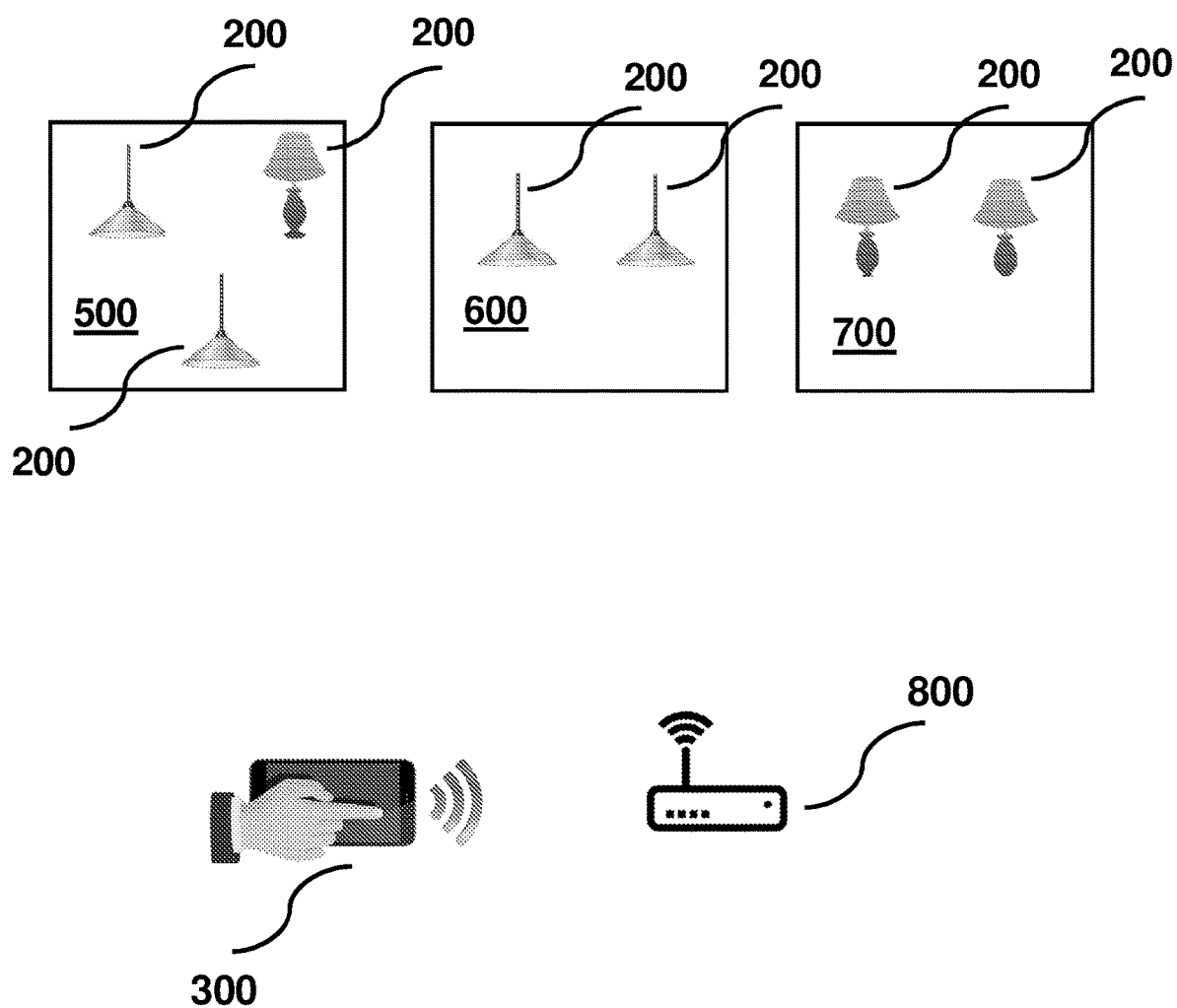
FIG. 4 depicts an example layout of a lighting system as used in accordance with an embodiment of the present invention.
Figure 5:
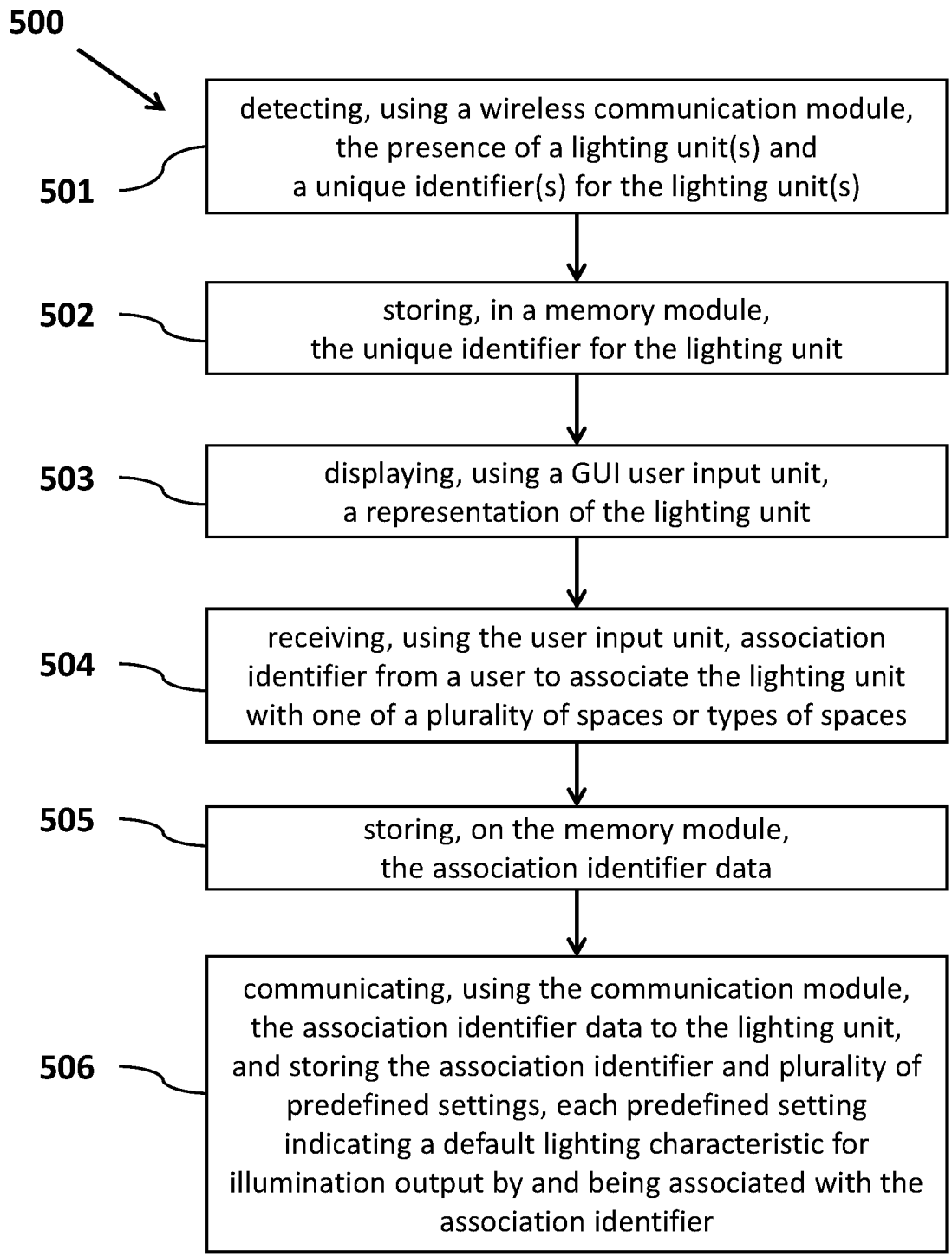
FIG. 5 shows a flow-diagram of method steps in accordance with one embodiment of the present invention.

Referring to FIG. 4, a system is provided for operating multiple lighting units (200) installed in various rooms (500,600,700) of a building so as to assist in maximising the functional potential of all lighting units (200) whilst minimising the need to tediously configure settings of each individual lighting unit. For illustrative purposes only, a smartphone (300) will hereafter be referred to as an example of the user input unit that is used by a user.

As shown in FIG. 4, a user may conveniently use the smartphone (300) to selectably associate each of the lighting units with the various rooms (500,600,700) of the building in which they are located such that each lighting unit (200) is configured to automatically output predefined default lighting characteristics corresponding to each of the rooms (500,600,700) or types of rooms in the building in which they are located. The smartphone (300) is also configured to output suggestions instructing the user when it is optimal to group certain lighting units (200) together based on best practices—for instance when two or more lighting units (200) of the same type have been associated by the user with the same room (500,600,700) or same type of room. The system also allows a user to use the smartphone (300) to manually define groups of lighting units (200) of the same type located in the same room or same type of room. The predefined default lighting characteristics settings for the lighting units (200) associated with the various rooms or types of rooms in the building, and, the suggestions for grouping the lighting units together, are predefined based upon an established set of best practices and common patterns of configuration and organisation of the various types of lighting units based on their location in the rooms of the building so as to assist in maximising the functional potential of all lighting units whilst minimising the need to tediously configure settings of each individual lighting unit.

Figure 1:
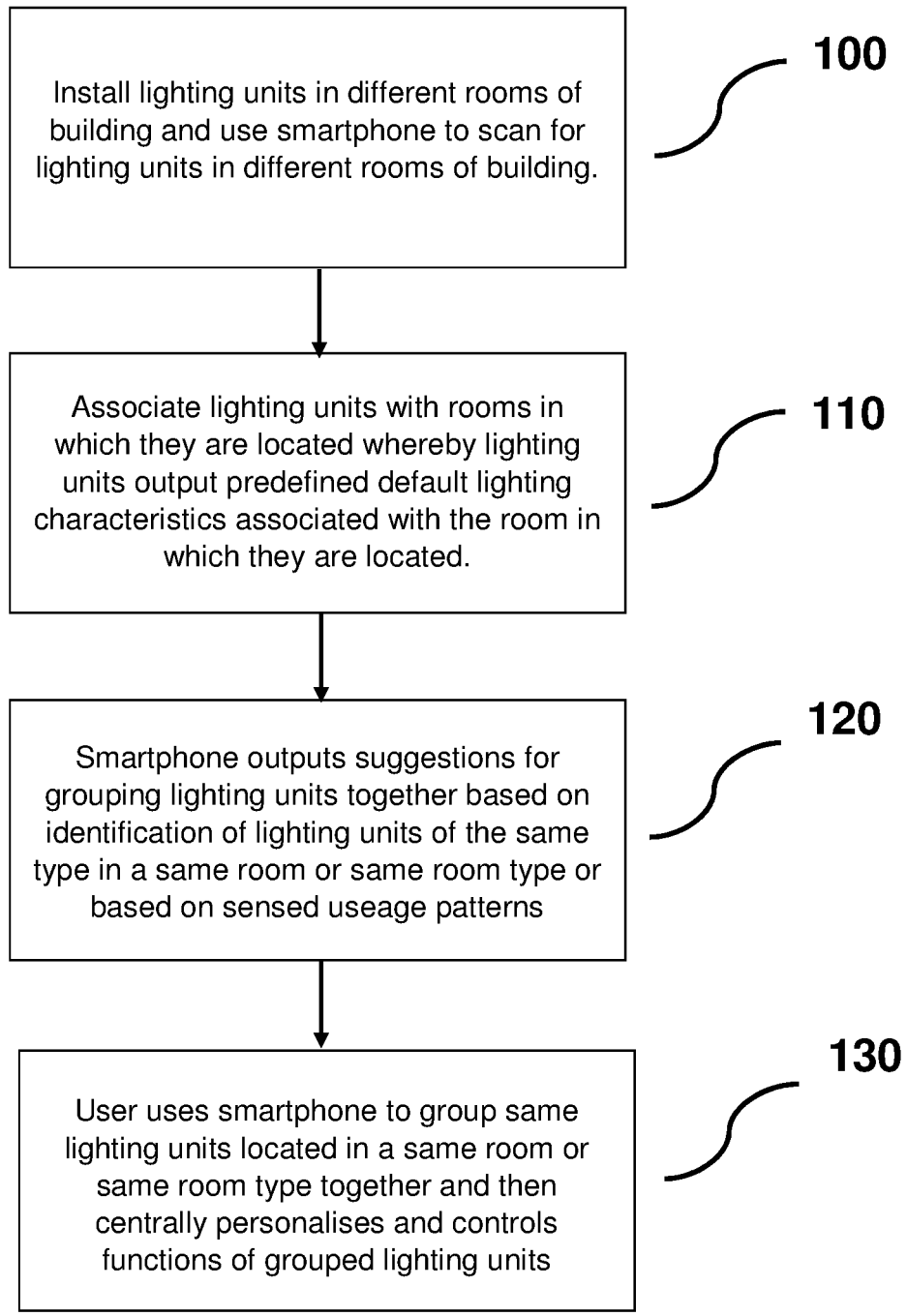
FIG. 1 shows a flow-diagram of method steps in accordance with one embodiment of the present invention.
Figure 2:
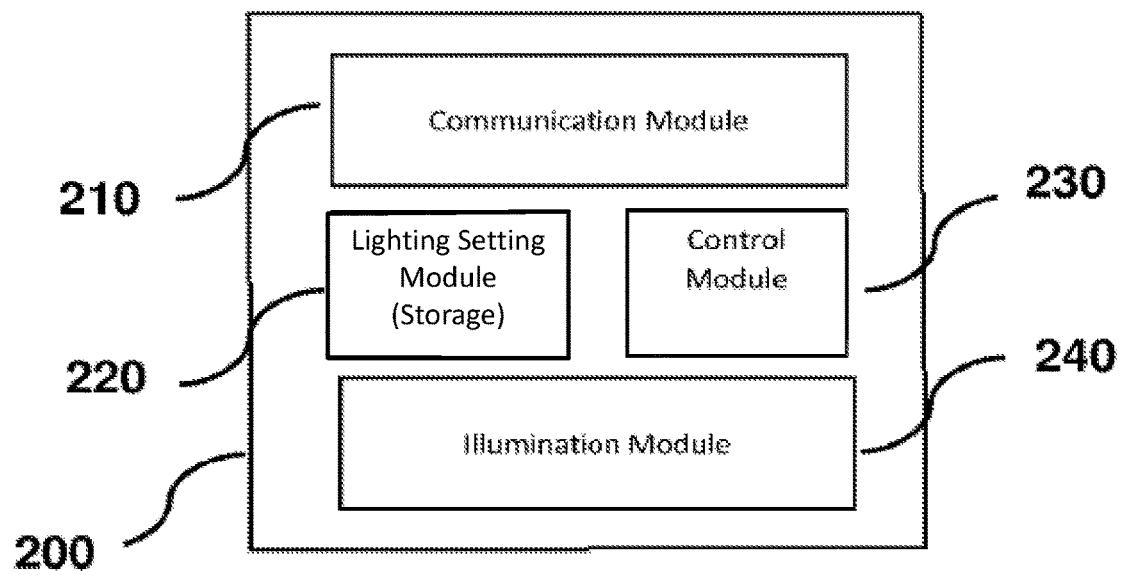
FIG. 2 shows a functional block diagram of a lighting unit used in accordance with an embodiment of the present invention.

Referring to FIG. 2, each of the lighting units (200) includes an illumination module (240) for outputting lighting characteristics therefrom, a lighting settings module (220) for storing predefined lighting settings indicative of default lighting characteristics for output by the illumination module (240) depending upon the room or type of room in which the lighting unit (200) is located, and a communication module (210) for wireless communication with external devices such as the smartphone (300). The lighting units (200) each also include a control module (230) which is configured such that, in response to the user associating the lighting unit (200) with a room or type of room in which the lighting unit is located, the control module (230) will operate the illumination module (240) by reference to the lighting settings module (220) to output the predefined default lighting characteristic associated with the room or type of room in which it is located. Each of the lighting units (200) may also contain an identifier stored in the lighting settings module (220) that is readable by the smartphone (300) so as to identity each of the scanned lighting units (200) including the type, make and model of each lighting unit (200).

Figure 3:
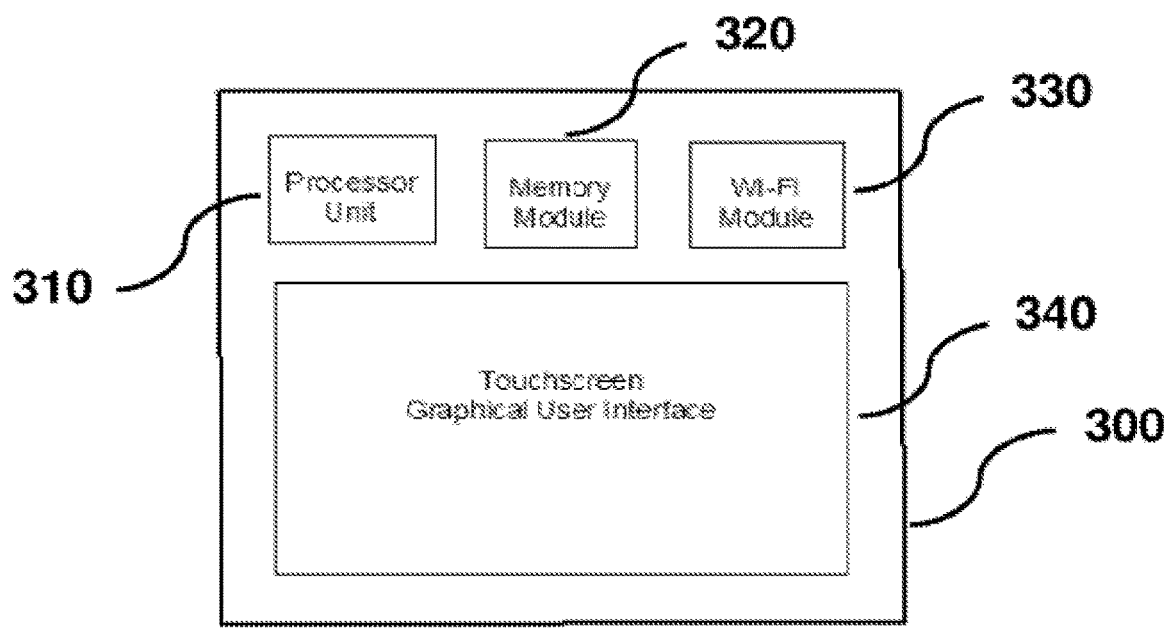
FIG. 3 shows a functional block diagram of a user input unit used in accordance with an embodiment of the present invention.

Referring to FIG. 3, the smartphone (300) includes a processor unit (310) operably connected with a memory module (320), a touchscreen display (340), and a communication module (330) via which the smartphone (300) is able to communicate with external devices. The communications module (330) includes a WI-FI sub-module configured for communication via a WI-FI router (800) with WI-FI transceivers in each of the lighting units (200). A software application is downloadable into the memory module (320) of the smartphone (300) from an online server via the Internet or any other communication network and is executable by the processor unit (310) of the smartphone (300) to provide the graphical user-interface (340) operable on the touchscreen display (340) via which a user may organise and configure the various settings of the lighting units. In this embodiment, the graphical user interface (340) may display icons representing the different lightning units (200) in rooms (500,600,700) of the building that have been scanned by the communication module of the smartphone, the type/model of each lighting unit (200) that is sensed by the communication module (330), and a representation of different types of rooms which may typically be found in the building. With these basic representations displayed on the graphical user interface (340) the user is able to effect associations between various lighting units and the rooms or room types in which they are located, and to group the various lighting units together, when appropriate to do so.

To illustrate one example of how the system may operate in certain embodiments, FIG. 4 shows various rooms comprising a bedroom (500) a kitchen (600) and a living room (700) in a household building with each room containing different types of lighting units. The lighting units in each room (500,600,700) will output different lighting characteristics depending upon the room that they are in and also depending upon the type of lighting unit involved. The lighting characteristics are based on default lighting characteristics that are predefined in accordance with an established set of best practices and common configurations/settings. When any given lighting unit is moved from one room to a different type of room in the household and the lighting unit is then associated with the new room, the lighting unit may be configured to output a new and different default lighting characteristics that is predefined for that particular type of lighting unit for the new room in which it is located.

A user may typically commence setting up each of the lighting units in the various rooms (500,600,700) in the following manner. The user will start by entering the bedroom (500) and switching on the software application running on a smartphone (300). Each of the lighting units (200) in the various rooms when switched on are connected to a home Wi-Fi network via their respective communication modules. The smartphone (300) will scan and detect all lighting units that are connected to the WI-FI network and will display a series of user-interactive representations of each lighting unit on the graphical user interface (340) of the smartphone (300). The representations of each lighting unit (200) includes a combination of an icon representing the type of lighting unit (e.g. table lamp, ceiling lamp, spotlight, floor lamp etc.) and some text underneath each icon which represents a unique name or identifier for each lighting unit (which may for instance be analogous to a MAC address of the lighting unit that is programmed into the lighting settings module of each lighting unit). The software application will also allow the user to create room icons on the graphical user interface (340) that represent the actual rooms (500,600,700) of the household. Once the room icons are created, the user is thus able to associate lighting icons representing actual lighting units with the room icons to create associations between them. By way of example, the software application may be configured to display via a user-interactive menu on the graphical user interface (340), a listing of different room type templates which may typically be found in a household such as a "bedroom", "kitchen", "living room", "dining room", "garage", "outdoor", "hallway" by way of example. Whenever a room type template is selected from the menu by the user, a new room icon is generated that corresponds to the room type template listing selected from the menu. Where there are multiple rooms of the same type in the household, multiple room icons can be generated on the graphical user interface (340) when the user selects the relevant room type template multiple times.

Referring to the present example now, the user may commence configuring each of the lighting units (200) in the various rooms (500,600,700) of the household by moving from one room to another in turn and setting up the lighting units (200) in each room to associate the lighting units (200) with the room in which they are located. The user in this example may arbitrarily commence the setup by firstly visiting the bedroom (500) and then selecting the room type template "bedroom" from the interactive-menu on the graphical user interface (340) to generate a bedroom icon on the graphical user interface (340). A new room icon will be created on the graphical user interface (340) representing the bedroom in which the user is currently located. If there is only one bedroom in the household, the icon will be labelled simply as "bedroom" however if there are multiple bedroom icons generated which represent multiple bedrooms in the household, the graphical user interface will be configured with a customisation function to allow the user to customise the labelling for each bedroom icon that is created so as to allow each bedroom to be distinguishable. Once a room icon has been generated on the graphical user interface (340) of the smartphone (300) to define an actual room of the household, it will remain usable for future configurations and changes of settings as required by the user.

Thereafter, the user will identify via the graphical user interface (340) the lighting icons representing each of the actual lighting units (200) located in the bedroom (500) in order to then selectably associate these lighting units with the bedroom (500). In this example, there are three lighting units located within the bedroom (500), two table lamps and a ceiling lamp. The user may for instance be able to identify the icons for these lighting units as they may be labelled with a unique text identifier under the icons which may also be displayed on the physical lighting unit itself.

The user will in turn create an association between each of the three lighting units and the bedroom (500) by for instance dragging the icons representing each of the three lighting units into contact with the bedroom icon on the graphical user interface (340). The graphical user interface is programmed to sense this interaction of the icons and interpret this interaction as effecting an association between the actual lighting units and the actual bedroom represented by the icons. In response to this association being made, the software application running on the smartphone (300) will store within the local memory store (320) a record of this and all other associations that are made between lighting units and rooms in the household so that the graphical user interface (340) will reflect the current status of all associations at any given time when the user is using the smartphone (300) to configure lighting units (200). Upon making the association between the three lighting units and the bedroom, the smartphone (300) is also configured to communicate, via the WI-FI network, association data that is indicative of the association of each of the three lighting units with the actual bedroom (500) whereupon the association data is stored in the lighting settings modules of the respective lighting units. In its simplest form the association data may simply indicate to the respective lighting units that the type of room in which with which they are currently associated is a bedroom, and, if there are multiple bedrooms defined, an identifier identifying the particular bedroom with which the lighting units are associated so that the lighting unit may distinguish which particular bedroom it is located in.

Thereafter, for each lighting unit in the bedroom, the control module will read the association data stored in the lighting settings module and based on this information will now recognise that the lighting units are located in and associated with the bedroom of the building. The control module of each lighting unit will then automatically operate the respective illumination modules of each lighting unit to output predefined default lighting characteristics (as stored in the lighting settings module) which are suited for operation of the respective lighting units in a bedroom type room setting by reference to the lighting settings module indicating the association of the lighting units with the bedroom. Because the table lamps and the ceiling light are functionally different types of lighting units with different operational capabilities, the predefined default lighting characteristics that will be output by these different types of lighting units will generally be quite different in the context of a bedroom setting or any other given room setting. Also, one type of lighting unit that is installed in one type of room (for instance a bedroom) may be used in accordance with a very different useage pattern when the same lighting unit is installed in a different type of room (for instance a garage). Embodiments of the present invention recognise and reflect this by automatically providing predefined default lighting characteristics for different types of lighting units when installed in different types of rooms based on established best practices so that the functional potential of each lighting unit may be maximised. In comparison, certain existing lighting systems tend to configure all lighting units to operate in exactly the same way irrespective of the type of lighting involved and irrespective of the room in which the lighting unit is located and the functional potential and ability to personalise the output of each lighting unit for optimal performance is compromised.

The user will repeat the above steps for each of the remaining rooms in the household so as to associate all lighting units in each room with the respective rooms. If a user wishes to move a lighting unit from one room to another, for instance, if one of the table lamps is moved from the bedroom (500) to the kitchen (600), after installing the table lamp in the kitchen (600), the user will via the graphical user interface (340) of the smartphone (300) create a new association between the newly moved table lamp and the kitchen (600) in the manner described above. The control module of the table lamp will now control the output of the table lamp to output a different lighting characteristic to when the table lamp was previously installed in the bedroom (500). If the table lamp is subsequently moved back to the bedroom (500) by the user the lighting settings for the table lamp may be quickly and easily configured again so as to be suitable for bedroom (500) in which it is again located by simply creating the association between the table lamp with the bedroom (500) via the smartphone application. Conveniently, this obviates the need for technically unskilled home users to have to perform complex and tedious configurations of the multiple lighting units to configure them to operate optimally. Also, by providing predefined room type templates in the smartphone application having easily recognisable and familiar names such as "bedroom", "kitchen", "garage" etc with which a user is able to associate various lighting units, this provides a much easier to understand, intuitive and meaningful user-interface for the unskilled home user than compared to existing systems which tend to group lighting units under non-descript labels such as "room1", "room2", "mygroup", ceiling-group, etc which do not lend themselves to ease of use particularly by technically unskilled home users.

It should be noted that in certain embodiments of the present invention there may be a variety of different templates for different room type that may be selectable in the user-interactive menu of the graphical user interface (340) for each different type of room (500,600,700). The availability of different templates for any given room type may be useful because for example different bedrooms in a household may typically be very different in nature and therefore be suited to different lighting characteristics from the same type of lighting device. For instance, two different bedrooms may vary in terms of size, configuration, ambient lighting, furnishings and decor, and the occupants of the different bedrooms may necessitate different lighting characteristics being output by any given lighting unit. Therefore in accordance with embodiments of the present invention, not only may there be different predefined default lighting characteristics for each type of room, but there may also be different predefined default lighting characteristics for different rooms of the same type. These templates may be customisable by a user via the graphical user interface and they may also be shared amongst different users via an on-line database or web site providing access to different user created templates for instance.

It is also possible for lighting units (200) of the same type in the same room or in the same room type to be defined within a group. Conveniently, the smartphone (300) is also configured to automatically recognise when similar lighting units (200) that are located in a common room or common room type within the building and to automatically output an instructional message to the user via the graphical user interface suggesting the grouping of the similar lighting units together. For instance, in the current example, as there are two identical table lamps located in the bedroom, the smartphone will recognise that these lighting units are of the same make and model and located in the same room and will then display a text message upon the graphical user interface instructing the user to group the table lamps together. The grouping operation may be effected by any means but for simplicity may involve simply dragging and dropping icons representing each of the table lamps on to another graphical icon representing the group. Upon defining the grouping between the table lamps via the graphical user interface, the smartphone is configured to wirelessly communicate data indicative of the grouping to each of the table lamps so that when any one of the table lamps in the group are controlled (for instance by a remote control or a light switch), the other table lamp may follow the same operation. This may involve each of the table lamps relaying operational commands to the other table lamp so that they all follow the same operation. Also, as the table lamps are now grouped together, any further customisation and controlling of functionality of the table lamps may now be performed centrally on a group basis via the graphical user interface, so as to avoid unnecessary duplication of time and effort required in having to repeatedly configure and control multiple lighting units of the same type. In alternate embodiments of the present invention it is possible to group different types of lighting units together and/or lighting units which may be located in different rooms.

Furthermore, in certain embodiments of the present invention, the useage patterns of multiple lighting units installed within a premises may be monitored and analysed, with information resulting from the analysis then being useable to automatically control operations of the lighting units mimicking the useage behavior of the user. By way of example, if a user has a tendency to switch on, and off, two lamps at the same time, this useage pattern is able to be detected whereby both of these lighting units may then be configured to switch on and off at the same time automatically without the user necessarily switching on or off both lighting units. Embodiments may provide even more advanced functionality by detecting the time at which the multiple lighting units are switched on or off at the same time and then configuring the relevant lighting units to automatically switch on or off at a given time at which they would normally be switched on or off by the user. This would obviate any physical operation of the lighting units by the user. Other useage patterns that may be detected and copied automatically by groups of lighting units may include for instance the time of day at which certain lighting units are switched on or off, or, the order in which certain groups of lighting units are switched on or off.

In one exemplary implementation of this functionality, a central control unit may be communicatively connected with all lighting units in the household via the WI-FI network. Whenever any of the lighting units performs a function such as being switched on or switched off, the functions and timing of the functions may be detected by the central control unit via the WI-FI network. Thus for instance, when one lighting unit is switched on within a relatively short time to another lighting unit being switched on, then those two lighting units may be recorded as a potential match by then central control unit with a rank of 1. Subsequently, every time these same two lighting units are switched on, or switched off, or modified in a same way, within a relatively short time (e.g. 2 seconds), the rank of 1 may be incremented to further indicate that the useage pattern of the two lighting devices are connected. When the ranking meets a predetermined threshold value, the central control unit may be configured to automatically configure the two lighting units to automatically copy each other's behavior without requiring user operation of both lighting units in future.

In certain embodiments of the present invention, the predefined settings indicative of default lighting characteristics for output by illumination modules of the lighting units may be manually or automatically updated periodically. By way of example an online database may store the predefined settings which may be centrally updated from time to time. Each of the lighting units may be communicably connected with the online database via an Internet connection and may be configured to manually or automatically download updated settings periodically from the database into the settings modules of the lighting units. The online database may also include a front-end web interface via which users may upload and share their own user-created settings in respect of different types of lighting units and for different types of rooms which may be browsed and selectably downloaded by other users.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A lighting unit comprising:
an illumination module configured to output illumination according to a plurality of lighting characteristics;
a wireless communication module configured to wirelessly receive an association identifier, wherein the association identifier identifies a space or a type of space with which an installation location of the lighting unit is associated;
a lighting settings storage module configured to store a lighting unit identifier, the association identifier and a plurality of predefined settings, each predefined setting of the plurality of predefined settings being indicative of a default lighting characteristic of the plurality of lighting characteristics for output by the illumination module and being associated with the spaces or types of spaces identified by the association identifier; and
a control module configured to automatically access the lighting setting storage module and operate the illumination module to output illumination according to the default lighting characteristic associated with the association identifier data stored in the lighting setting storage module.

2. The lighting unit of claim 1 wherein the plurality of lighting characteristics are each defined by a color characteristic and a brightness characteristic.

3. The lighting unit of claim 2 wherein at least one of the plurality of lighting characteristics is defined by a timing characteristic for the output of the color and brightness characteristics.

4. The lighting unit of claim 1 wherein the plurality of lighting characteristics include a customized lighting characteristic.

5. The lighting unit of claim 1 wherein the wireless communication module is configured to wirelessly receive the association identifier data from a user input unit, the user input unit being configured to selectably associate the lighting unit with the spaces or the types of spaces in which the lighting unit is located.

6. The lighting unit of claim 5 wherein the user input unit is a mobile phone, a tablet, or a computer.

7. The lighting unit of claim 5 wherein the lighting settings storage module is configured to change the stored association identifier data based on a subsequent association identifier received by the wireless communication module from the user input unit.

8. The lighting unit of claim 1 wherein the association identifier data identifies both the space and the type of space associated with the association identifier.

9. The lighting unit of claim 1 wherein the space or the type of space is one of a dining room, a kitchen, a bathroom, a bedroom, a living room, a hallway, a study, a garage, and an outdoor space in relation to a building.

10. A method for controlling a first lighting unit, the method comprising:
detecting, using a wireless communication module, the presence of a first lighting unit and a first identifier uniquely identifying the first lighting unit;
storing, in a memory module, the first identifier uniquely identifying for the first lighting unit;
displaying, using a user input unit, a representation of the first lighting unit, the user input unit including a graphical user interface and being configured to selectably associate the first lighting unit with one of a plurality of spaces or the types of spaces in which the first lighting unit is located;
receiving, using the user input unit, an association identifier from a user, the association identifier associating the first lighting unit with one of the plurality of spaces or types of spaces in which the first lighting unit is located;
storing, on the memory module, the association identifier associating the first lighting unit with the one of the plurality of spaces or types of spaces in which the first lighting unit is located;
communicating, using the wireless communication module, the association identifier associating the first lighting unit with the one of the plurality of spaces or types of spaces in which the first lighting unit is located to the first lighting unit, wherein the first lighting unit:
stores in a lighting settings storage module the association identifier and a plurality of predefined settings, each predefined setting of the plurality of predefined settings being indicative of a default lighting characteristic of the plurality of lighting characteristics for illumination output by the first lighting unit and being associated with the spaces or types of spaces identified by the association identifier; and
automatically accesses the lighting setting storage module using a control module and operates the illumination module to output illumination according to the default lighting characteristic associated with the association identifier data stored in the lighting setting storage module.

11. The method of claim 10, wherein the graphical user interface of the user input unit displaying the representation of the first lighting unit comprises displaying the representation as an icon on the graphical user interface.

12. The method of claim 11, wherein the step of receiving the association information from the user comprises enabling the user to drag the icon into contact with a representation of the one of the plurality of spaces or types of space.

13. The method of claim 10 wherein the user input unit is a mobile phone, a tablet, or a computer.

14. The method of claim 10 wherein the one or more of the plurality of spaces or types of spaces includes a dining room, a kitchen, a bathroom, a bedroom, a living room, a hallway, a study, a garage, or an outdoor space in relation to a building.

15. The method of claim 10 further comprising:
detecting, using the wireless communication module, the presence of a second lighting unit and a second identifier uniquely identifying the second lighting unit;
sensing a condition, based on the first identifier and the second identifier, when the first lighting unit and the second lighting unit are of a same type and are located within a same space or same type of space; and
communicating, using the user input unit and in response to the sensing of the condition, to the user a message instructing the user to defined a group setting indicative of a group of at least the first and second lighting units;
storing, on the memory module, the defined group setting indicative of a group of at least the first and second lighting units and the association identifier associating the first and second lighting unit with the one of the plurality of spaces or types of spaces in which the first and second lighting units are located; and
communicating, using the wireless communication module, the defined group setting indicative of a group of at least the first and second lighting units and the association identifier associating the first and second lighting unit with the one of the plurality of spaces or types of spaces in which the first and second lighting units are located to the first and second lighting units.

16. A computer program product stored on a non-transitory computer-readable medium, the computer program product comprising program code instructions for implementing the method of claim 10 when executed by a processor for controlling the first lighting unit.

\* \* \* \* \*